United States Patent [19]
Bromley

[11] Patent Number: 5,611,694
[45] Date of Patent: *Mar. 18, 1997

[54] INTERACTIVE TALKING PICTURE MACHINE

[76] Inventor: Eric Bromley, 4 Watson Dr., West Simsbury, Conn. 06092

[ * ] Notice: The term of this patent shall not extend beyond the expiration date of Pat. No. 5,474,457.

[21] Appl. No.: 469,100

[22] Filed: Jun. 6, 1995

Related U.S. Application Data

[63] Continuation of Ser. No. 74,775, Jun. 9, 1993, Pat. No. 5,474,457.

[51] Int. Cl.[6] ............................................. G09B 5/06
[52] U.S. Cl. ................................... 434/311; 434/308
[58] Field of Search ................................. 434/311, 310, 434/309, 308, 342, 321; 235/462

[56] References Cited

U.S. PATENT DOCUMENTS

| | | |
|---|---|---|
| 2,447,370 | 8/1948 | Silverman . |
| 2,953,859 | 9/1960 | Fink ................................. 434/342 X |
| 3,154,862 | 11/1964 | Colpepper, Jr. . |
| 3,212,199 | 10/1965 | Clark . |
| 3,382,588 | 5/1968 | Serrell et al. . |
| 3,408,749 | 11/1968 | Brudner ................................. 434/310 |
| 3,466,758 | 9/1969 | Miller . |
| 3,666,872 | 5/1972 | Powell et al. ........................... 434/310 |
| 3,693,268 | 9/1972 | Thompson ............................... 434/310 |
| 3,715,811 | 2/1973 | Thompson et al. ...................... 434/310 |
| 3,729,836 | 5/1973 | Maueda . |
| 3,757,322 | 9/1973 | Barkan et al. . |
| 3,780,450 | 12/1973 | Podkopaer et al. . |
| 3,789,136 | 1/1974 | Haith et al. . |
| 3,884,565 | 5/1975 | Tanno . |
| 3,964,188 | 6/1976 | Dimitracopoulos . |
| 3,984,923 | 10/1976 | Rawson et al. . |
| 4,079,431 | 3/1978 | Marut . |
| 4,288,537 | 9/1981 | Knetzger . |
| 4,425,099 | 1/1984 | Naden ................................ 434/311 X |
| 4,457,719 | 7/1984 | Dittakavi et al. . |
| 4,464,118 | 8/1984 | Scott et al. . |
| 4,466,801 | 8/1984 | Dittakavi et al. . |
| 4,482,329 | 11/1984 | Shindo ................................. 434/342 |
| 4,703,573 | 11/1987 | Montgomery et al. . |
| 4,778,391 | 10/1988 | Weiner . |
| 4,884,974 | 12/1989 | Desmet . |
| 4,968,255 | 11/1990 | Lee et al. . |
| 4,997,374 | 3/1991 | Simone . |
| 5,001,696 | 3/1991 | Baldwin . |
| 5,059,126 | 10/1991 | Kimbau . |
| 5,167,508 | 12/1992 | McTaggart . |
| 5,474,457 | 12/1995 | Bromley ................................ 434/311 |

OTHER PUBLICATIONS

*Fixed Format Instruction Delivery System*, Fox, R.G. and Ludeman, C.P. ( Authors), IBM Technical Disclosure Bulletin, International Business Machines Corporation (Publishers), Armonk NY, vol. 18, No. 1, Jun. 1975, pp. 157–163.

Primary Examiner—Gene Mancene
Assistant Examiner—Jeffrey A. Smith
Attorney, Agent, or Firm—Fishman, Dionne & Cantor

[57] ABSTRACT

An electronic talking picture machine is presented which permits human operators to cause speech or sound accompaniment and branching (or alternate) story lines which affect the outcome of a story. In a preferred embodiment, the speech, sound and branching (or alternate) story line information is enclosed as a bar code printed on a picture story belt. The picture story belt is enclosed in a cartridge which contains a mechanism to "roll" the belt from one spool to another so that a sequence of pictures may be viewed. The bar code contains information as to speech, such as conversation narration, questions and answers and sound (other than speech). The information on the bar coded picture story belt is entered into the electronic talking picture machine by inserting the cartridge into a cartridge holding area containing conventional photo optical sensors which "reads" the code when the belt is moved to expose the next picture in the sequence. The electronic talking picture machine has a plurality of controls to allow the human reader to advance the story, control branching, story lines, answer questions and to make certain pictured characters speak to make sounds.

20 Claims, 8 Drawing Sheets

INTERACTIVE TALKING PICTURE MACHINE

This is a continuation of application Ser. No. 08/074,775 filed on Jun. 9, 1993 (now U.S. Pat. No. 5,474,457).

BACKGROUND OF THE INVENTION

This invention relates generally to the field of electronic talking books. More particularly, this invention relates to an electronic talking picture device which interacts with the reader based upon options selected by the reader. The interactive talking picture machine of the present invention is well suited for young children who enjoy having stories told to them from picture books.

Prior art electronic books which can talk are known in the field. However, such prior art books having high voice and sound quality are relatively expensive. In addition, prior art talking books do not interact with the reader. Also, prior art talking book machines are not programmable to allow the reader (i.e., child) to interact with the unfolding story. While there have been advances and improvements in the field of electronic talking books, there continues to be a need for new and improved electronic talking books which more closely resemble actual live story telling, are low cost like non-talking books, allow the reader more interaction with the story telling machine and provide the reader with more personal input in making the story characters speak, or in the case of animals making appropriate sounds. Additionally, control over the story line and outcome of the story is also desired as well as having the ability to help develop memory retention by asking questions and checking the answers.

SUMMARY OF THE INVENTION

The above-discussed and other drawbacks and deficiencies of the prior art are overcome or alleviated by the interactive talking picture machine of the present invention. In accordance with the present invention, an electronic talking book is presented which permits the human reader to input story line alternatives which affect the outcome of the story. The story (or collection of shorter stories) are encapsulated in relatively inexpensive cartridges (similar cost as to books) where all the pictures, and corresponding speech, sound and branching data are printed preferably on a laminated or plain paper "picture roll". In a preferred embodiment, each picture ("page") uses a four color picture process and fills up a 3×4 inch frame (of course, any other reasonable size is acceptable). Significantly, the story cartridges contain no electronics and so are extremely low cost. The "pages" comprise a frame such that the "story" is made up of a series of spaced frames which are sequentially advanced by winding a crank (or alternatively, using a battery operated motorized winding mechanism), in either case automatically stops at the next picture "page" in the story. While advancing from frame to frame a song is preferably played. The preferred cartridge can be inserted with either the "A" side or the "B" side up. By convention the "A" side is always the starting or dominant side. Each cartridge preferably contains two stories and/or a continuation of the first story on the "B" side. In a less preferable cartridge only one side (the "A" or "B" side) is played. In an also less preferable cartridge a continuous loop is employed thereby eliminating the need to flip sides.

In accordance with an important feature of this invention, information regarding the narration story, songs and the like are recorded on the roll using inexpensive coding means, preferably bar coding (or less preferably, magnetic tape). Printed bar code information corresponding to each "page" or frame in a "story" provides an extremely low cost and easily reproducible (through conventional printing and other reproductive methods) method of recording story information for use by the present invention whose preferred embodiment uses a stationary photo-optic sensor to "read" the code which is moved past the sensor when sequencing in from one frame to the next.

Each story cartridge is removably received in a cavity of a housing. The housing includes the cartridge cavity and a roll-moving spindle means, internal electronics and a plurality of input means (i.e., switches) for advancing the story (moving from frame to frame) and interacting with the story as discussed below. The cartridge cavity has a section coinciding with the cartridges viewing window which includes a multi-key pad (e.g., membrane key board) which may be aligned with objects or characters in a "page" or frame. That is, as a frame of the story is moved completely into the cartridge viewing window, the frame will be superimposed over keys such that pressing selected areas of the frame (picture) will cause speech, sounds, or other similar responses. Each page preferably has both pictures and words. Thus, when the reader touches a printed word in a sentence, an underlying key is actuated and the word or whole sentence is spoken; or when the picture, for example, of an animal is touched, an underlying key is actuated and the appropriate animal sound is heard or appropriate sentence spoken by the animal. There is also a provision for branching a story when the appropriate key pad switch or console switch is pressed.

Another feature of the present invention is that it can be switched between an "automatic" or "press and say" mode. In the latter mode, when the picture appears in the frame the words will not be spoken by the characters. In this way, the reader can read the line. If the reader has trouble, he or she can put their finger on any word on the line and the machine will say the line. In the automatic mode, the characters in the frame speak the printed words once the frame is fully within the window. In addition, other features such as questions and answers can be included by appropriate encoding of the cartridge in the cartridges such that this invention can take the form of a quiz game or educational device.

In another embodiment of this invention, the viewing section is provided with back lighting and the picture roll includes multiple color laminate using a black dot (half tone larger) filter such that the underlying color is only visible only when lit. This alternative embodiment is especially well suited for depicting cartoon or comic-like stories with apparent movement of the characters.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 11A is a plan view.

DESCRIPTION OF THE PREFERRED EMBODIMENT

Figure 1:
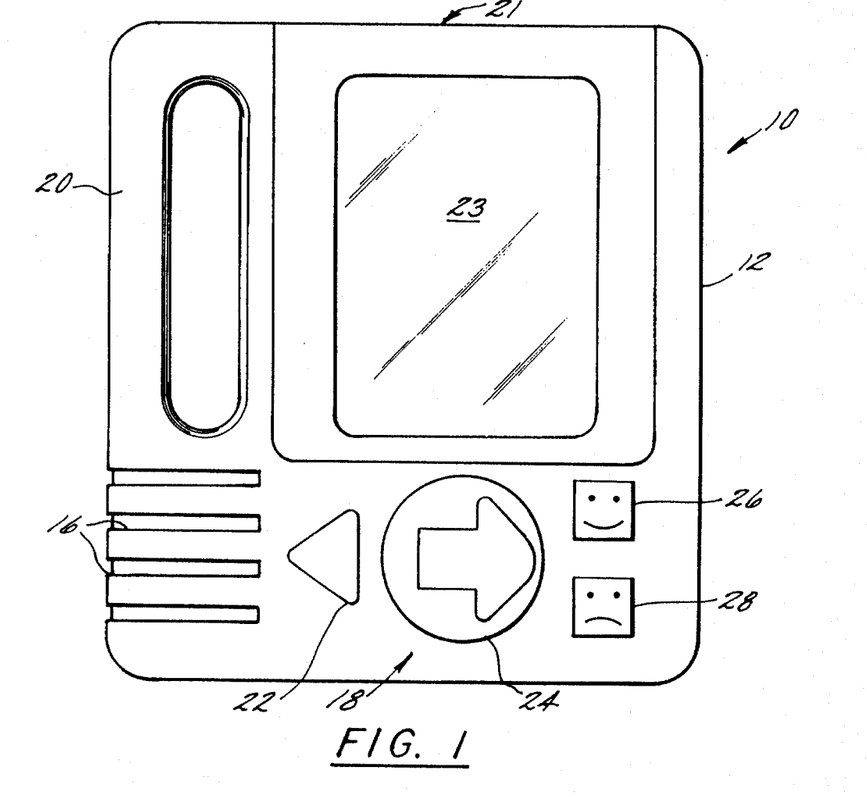
FIG. 1 is a front elevational view of an interactive talking picture machine in accordance with the present invention.
Figure 2:
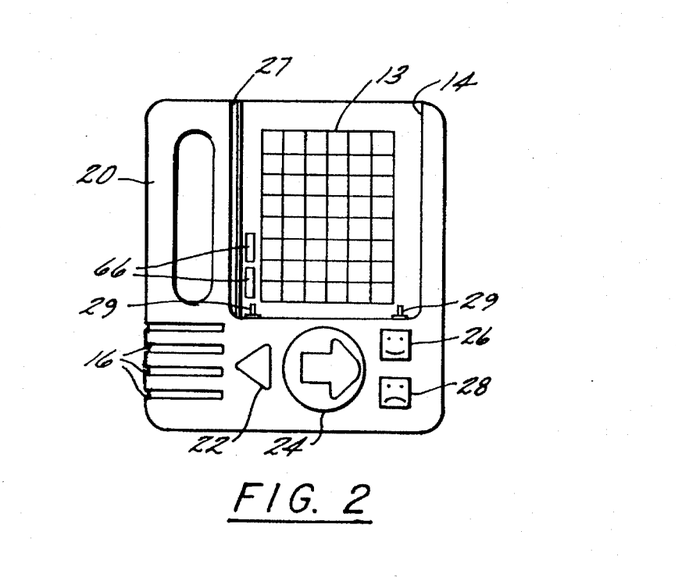
FIG. 2 is a front elevation view of the device of FIG. 1 with the cartridge ommitted.
Figure 3:
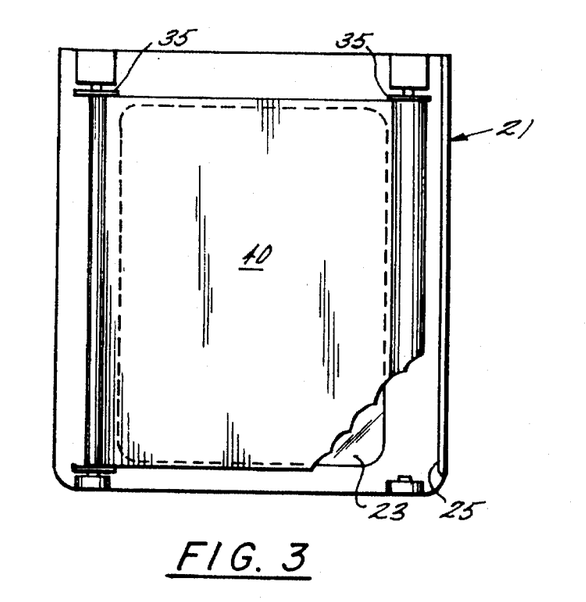
FIG. 3 is a rear view of a cartridge containing a roll having a story depicted therein in sequential frames and being provided with bar encoded information.

Referring to FIGS. 1, 2 and 3 an interactive talking picture machine in accordance with the present invention is shown generally at 10. Interactive talking picture machine 10 comprises a top and bottom, preferably molded housing 12 having a cartridge cavity 14, allowing for cartridge to be slidably inserted so as to mate with said housing a speaker portion 16, and a controls section 18. A handle 20 is molded into the housing 12. In the preferred embodiment, a cartridge 21 comprising a window portion 23, a story roll or belt 40 and a protrusion 25. The protrusion 25 is shaped to mate with a slot 27 located in the cartridge cavity 14 which functions to retain the cartridge 21 therein. Spindles 29 also located in cavity 14 mate with spools 35 for advancing the story roll 40 forward. Spindles 29 are interconnected with either a crank (not shown) or a motor e.g. battery operated and controlled by a switch 24. The front surface of housing 10 also includes a reverse button 22, and interaction buttons 26 (YES) and 28 (NO). An ON/OFF slide switch for turning on system is optionally employed. The reverse button 22 operates to reverse direction of belt movement for review of a picture which will be more fully described hereinafter. The cartridge cavity 14 also includes a membrane key pad and in this embodiment, the membrane key pad comprises e.g, a platform 13 of (6)×(8) switches. A battery and motor mechanism is located in the bottom housing handle area. In accordance with an important feature of the present invention belt 40 also comprises bar coding which includes an encoded stopping point, speech, sound effects branching, and question and answer instructions for each frame which will be more fully described hereinafter.

Figure 2A:
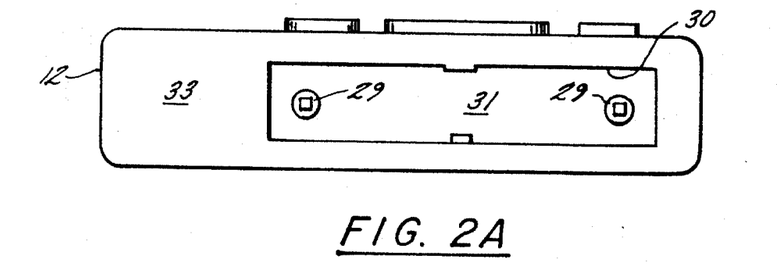
FIG. 2A is a top view showing an alternate embodiment of the interactive talking picture machine of FIG. 1.

In a less preferred embodiment shown in FIG. 2A a slot 30 leading to a chamber 31 for receiving a story cartridge 32 (FIG. 3A) is provided through upper surface 33 of housing 12. Cartridge 32 contains the story roll 40 and is advanced forward as previously described by either turning a crank (not shown) attached or by pressing switch 24 to energize a battery powered motor to advance the story belt.

Figure 3A:
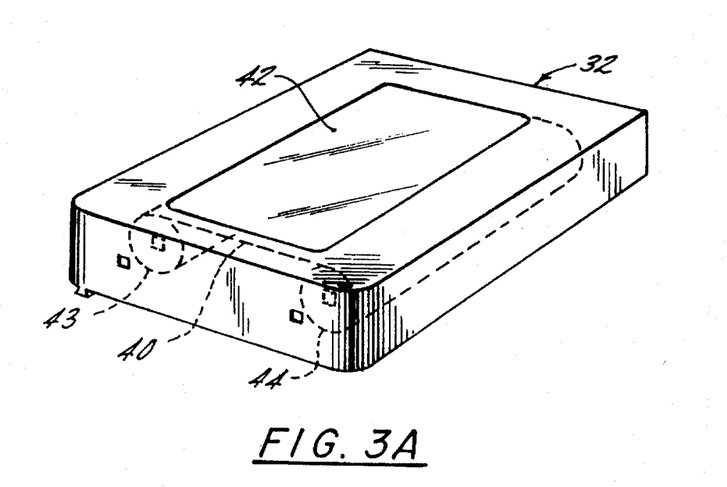
FIG. 3A is an alternate embodiment of a cartridge containing a roll having a story depicted therein in sequential frames and being provided with bar encoded information.

As shown in FIG. 3A, a less preferable cartridge 32 comprises a molded plastic housing with a window 42 for viewing a picture or frame on the belt 40 which is movable between two rotatable spools 43 and 44. Of course, in a less complicated but more fragile form of this invention, rather than combining each Story roll with a discrete cartridge (protective housing) or enclosure, the story rolls are placed on spools and (having bar coding thereon) are simply directly inserted into cavity 30 and operate in a manner similar to the music roll in a "player piano".

Figure 5:
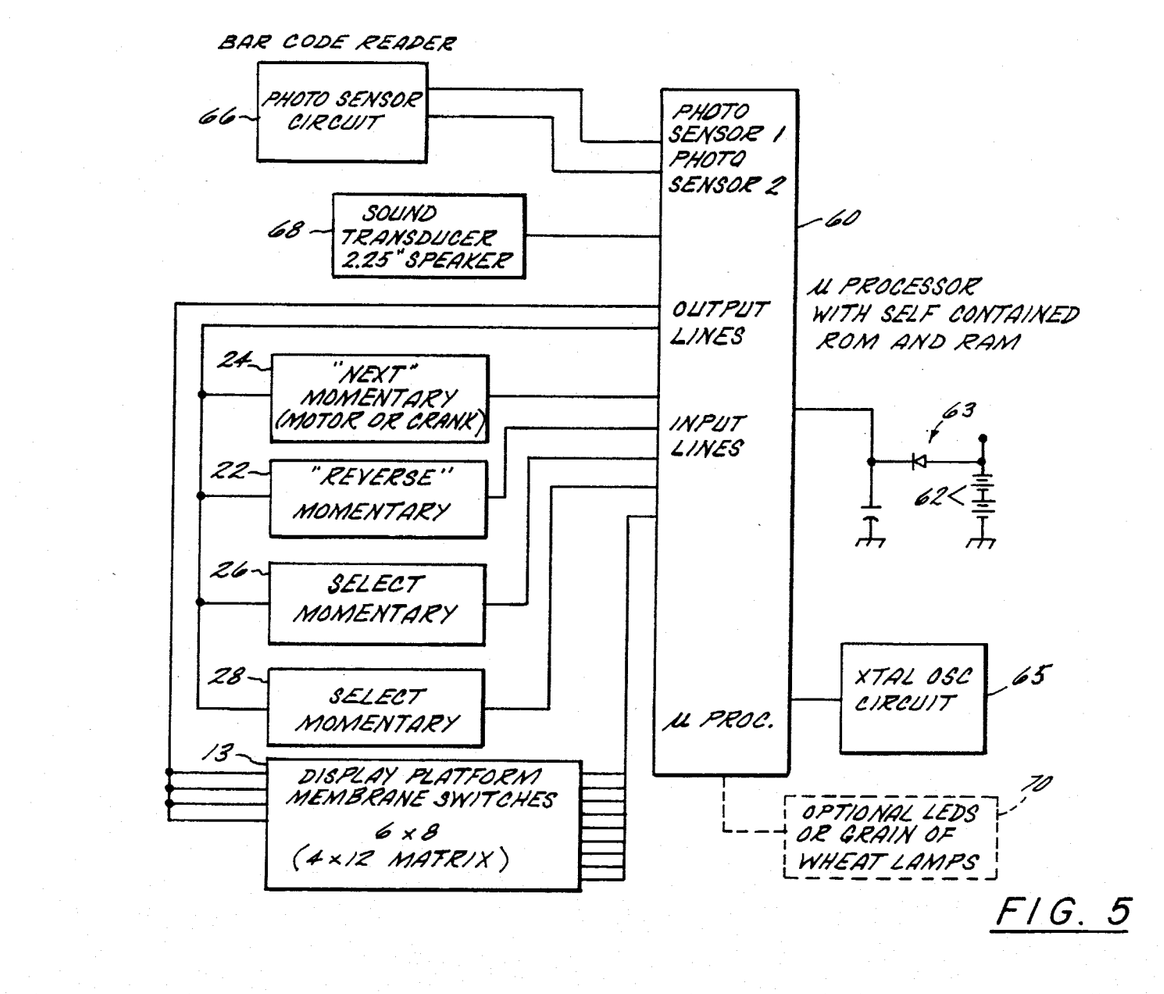
FIG. 5 is a block diagram of the electronic functions of the electronic interactive talking picture machine of FIG. 1.
Figure 6:
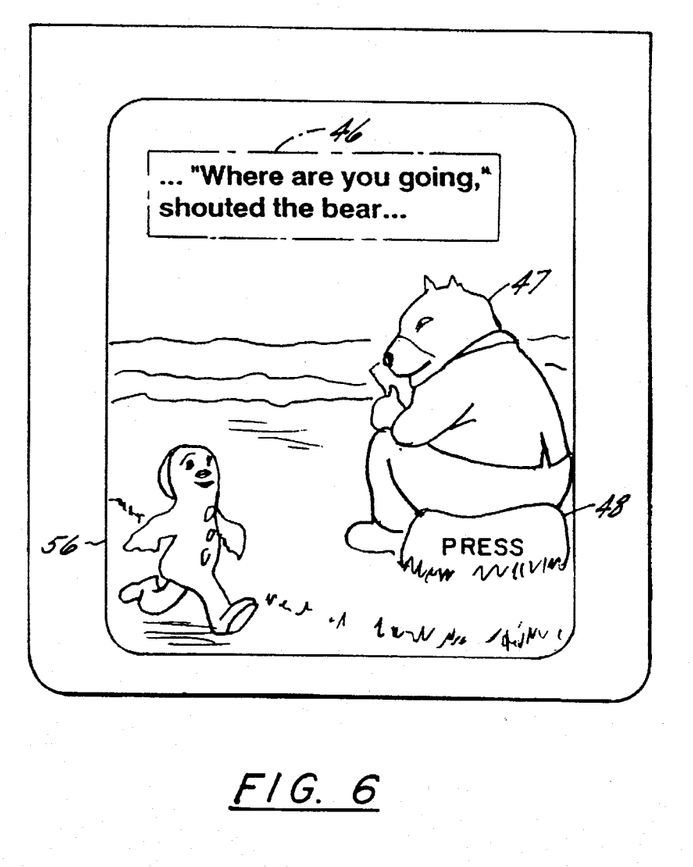
FIGS. 6–9 are the first four sequential pages or frames of an illustrative story which explain the operation of the interactive talking picture machine of FIG. 1.

FIG. 5 is a block diagram depicting the electronic components housed within housing 10. These components include a microprocessor 60 powered by e.g. batteries 62 of power circuit 63. A crystal oscillating circuit 65 is also employed and communicates with microprocessor 60. A bar code reader 66 (optical sensor) (see also FIG. 2) and a sound transducer 68 also communicates with the processor 60. FIG. 5 also shows the four switches 22, 24, 26 and 28 as well as the display platform membrane key pad 13. It will be appreciated that "next" block sequencing function 24 may comprise a hand-crank or a motor drive system. All of the components shown in FIG. 5 are well known and readily commercially available. Examples of suitable components for the interactive talking picture machine of this invention are described in my earlier U.S. Pat. No. 5,026,058, all of the contents of which are incorporated herein by reference. The microprocessor preferably is a 4 bit microprocessor with self contained Ram and Rom, for example, Hitachi HM C44 or National semi conductor's Cops 400.

In accordance with the present invention, stories can be created as if they were books. The stories are inexpensively written, type-set and printed preferably on paper belts 40. To protect the belt one could laminate a plastic film over the paper belt 40 which can be up to any suitable length that will fit within the cartridge 21 or preferably use a thin clear plastic, e.g. polycarbonate, for window for 23.

Figure 4A:
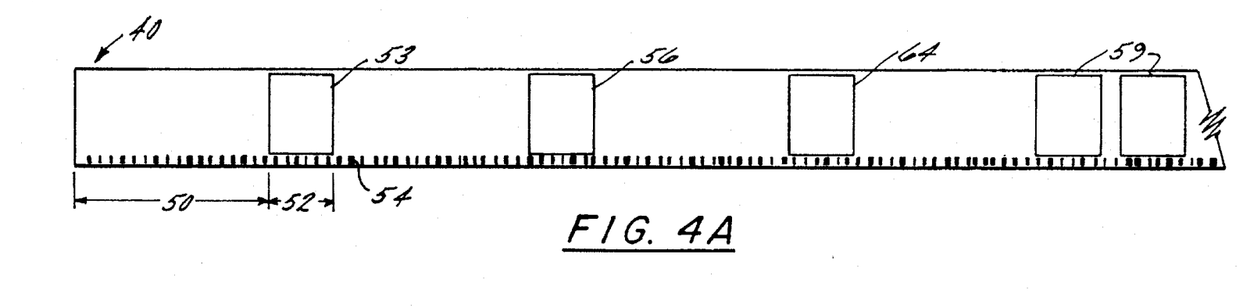
FIG. 4A is a segment of the story belt from the cartridge of FIG. 3 showing the first several pages of a story along with the bar coding of the interactive talking picture machine of FIG. 1, including multiple frame groups for branching.
Figure 4B:
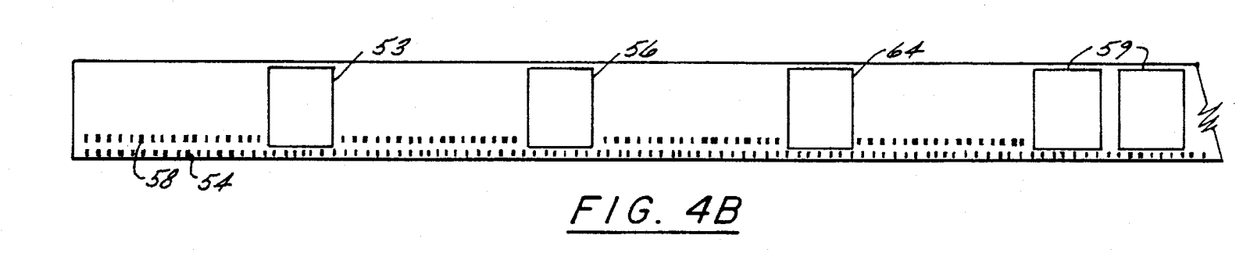
FIG. 4B is a segment of the story belt from FIG. 4A including multiple rows of bar coding.
Figure 4C:
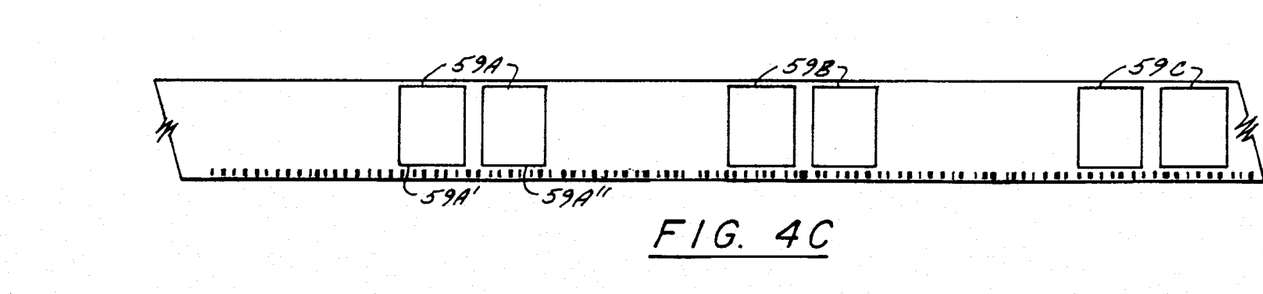
FIG. 4C is a continuation of the story belt of FIG. 4A.

Referring to FIGS. 4A and 4C, preceding each page or frame (e.g. first nine inches) is the appropriate coding for that frame which is preferably a bar coding 54 or some other photo-optically sensed code. The initial section of each roll (e.g. first nine inches) includes only a bar code (which loads the sound, and other data) and the next section (e.g. three inches) includes the picture or frame which should be visible through the window 23. Each subsequent picture will be preceded by enough space to enable sufficient bar coded data for that picture. The number of alternative stories which are operable at a given time determine the number of side by side pages (hereinafter called a frame or page group). Each page in a group is for a different branch of the story. The bar code for the main story could be, for example, the highest or second row 58 row at the middle of the belt. The first story branch would in this example use the second page of each group, and the second row of bar code. In the case of a single optical sensor 66, to read the code for the first branch, the selection key could lower the cartridge slightly (i.e., ⅛th of an inch), to position the second row of bar code over the optical sensor. However, the preferred method is to use a single sensor in combination with a single row of bar code 54 and use "start" and "stop" codes within bar code 54 to distinguish the first set of data and the second corresponding to the main and the branch pictures. In a less preferred method multiple rows of bar coding are employed and multiple sensors 66 (FIG. 2) are also employed (see FIG. 4B).

An index or start and stop code is employed which tells the microprocessor 60 to start saving data from a certain point and stop at an ending point. Thus branching info is just part of a long stream of data folded into one, two or more lines. Once the microprocessor "knows" what branch to use it stops the motor at the appropriate place. For use with a mechanical crank (not shown) the operator turns the crank which, e.g. normally locks upon movement of the belt 40 e.g. about 12". When the 1st Branch is selected the crank moves the belt an additional length, for example, 15 inches instead of 12 inches. During movement of the belt 40 the code of each page is read while the picture roll is advanced to that page. It will be appreciated that the hand crank may be of the wind up type so that during operation the crank may be turned and then a button (not shown) may be pushed for movement of the belt 40. In this case, the reverse button 22 would also be interconnected with the belt 40 mount to initiate a reverse direction thereof.

Referring again to FIGS. 4A and 4C, a segment of the cartridge belt is depicted showing the placement of the bar coding 54 and a beginning of a typical branching story. The story belt could be set up as follows: The nine inch area, area shown approximately at 50, preceding each frame (picture) is reserved for the rows of bar code (which loads the data). The next three inches, area 52, is for the first "page" or picture 53. The number of alternative stories which are operable at a time determine the number of side by side pages (in a page-group 59). Each page in a group is for a different branch of the story. A first page 59' is used for the main story and the first story branch uses a second page 59" of the group, and the bar code following the first Branch index. The second story branch would use the third page (not shown) of the page group 59 etc. The bar code row 58 for the first branch story is read as a result of by-passing the initial code sequence. This action in effect moves the belt in the forward direction 15 inches instead of 12 inches (the amount the belt would have moved if the story track had not been changed from the main story). Thus, the bar code reader stores only the second bar code set for the first story branch. This is how the bar code for each page is read while the picture roll is advancing to that page.

The bar coding may represent a variety of information which is integrated with stored information in the microprocessor. Examples of specific information preferably encoded on the bar coding includes speech, sounds such as animal roars, questions and answers, and branching information.

To facilitate the practical bar coding of speech and sound data a reduction scheme is used so that the bar code itself does not include actual digitized sound. Instead it contains only minimal codes which "call" the larger sound routines already stored in the microprocessor's 60 ROM or in an outboard ROM. For example, an 8 bit code can allow us access to over 250 words and sounds. Extra wide bars can be employed as start and stop or indexes for branch number indicators.

The belt 40 is depicted as including subsequent picture pages 64, 56. It should be noted that pages 56, 64, 59" and 59A" are equivalent to the FIGS. 6–9 to be discussed hereinafter. Of course, there is a limit to the number of spoken words for each page. This limit is a function of the total amount of digitized voice code stored in the tom in microprocessor 60. This limit can be overcome by employing either extremely dense bar code or magnetic tape and allowing the code itself to contain sound information.

Referring now to FIGS. 1, 6–9 and 10, the following sequence provides an example of the operation and performance of the interactive talking picture machine of this invention. First, the story (or collection of shorter stories) are written, type-set and printed on paper belts 40. Optionally the belts may be bound by laminating a plastic film over the paper belt 40 which can be up to any desired length which can be enclosed in a cartridge. Each colored page or frame ("page") fills up the frame with graphics and text. The pages are sequenced by winding a crank (or alternatively, using a battery operated motor), in either case it automatically stops at the next page in the story as previously described. While the picture is being sequenced, a song or sound effect is played. Each cartridge contains at least one story although it will be appreciated that more may be included. A front or "A" side story which may be continued on back or a back story, to accomplish this the cartridge roll is preferably printed on both sides. Thus, when the first story reaches the end, the cartridge can be removed and inserted in reverse (back side up). Of course, the second side can be a continuation of the first story and further multiple cartridges may be used for a single extended story.

Each page has both pictures and words. In the Press and Say mode when the child touches a word, the underlying membrane key pad is actuated and the entire sentence is spoken. For instance, referring to FIG. 6, and item 100 in FIG. 10, if the child presses any word or spot within the dotted rectangle generally shown at 46, the entire sentence "Where are you going? shouted the bear" will be spoken or heard. Press the bear 47 any place within the dotted rectangle generally shown at 48 and the bear will "growl". Note that the sounds and words are of digitially recorded quality which is preferably recorded by professional voices. This is accomplished as is previously described by accessing digitized speech and sound data stored in ROM.

Figure 7:
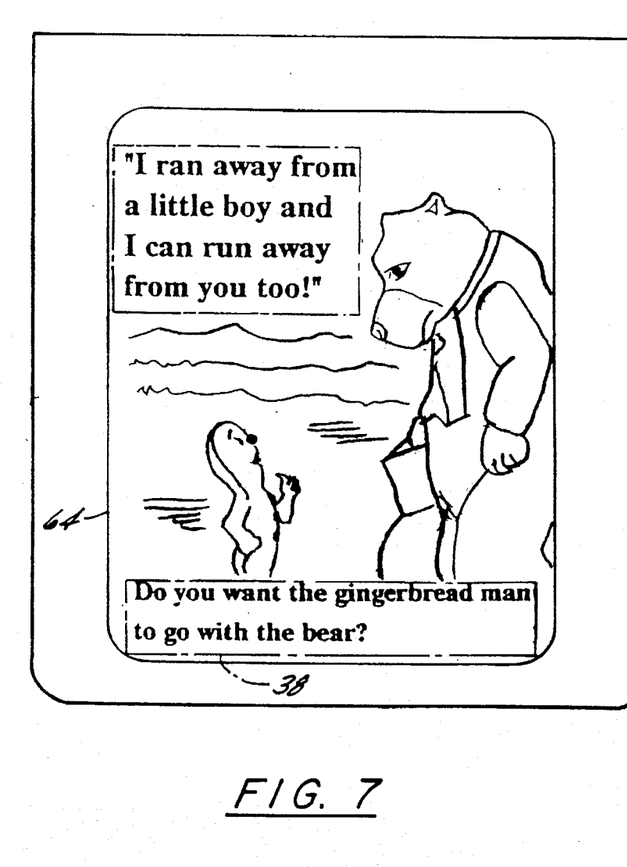

Press the "next" button 24 to go to the next "page" or picture (frame). Referring now to FIG. 7, and item 102 in FIG. 10, the "branching story" feature of the present invention will now be described. For example, at several points in the story, the interactive talking picture machine asks the listener to choose how he or she would like the story to continue. The selection is made by pressing e.g. a color-coded selection button or key (the "yes" or green key 26 with a smile face or the "no" or red key 28 with a frown face). The "yes" key 26 and the "no" key 28 may allow more than one option. Press the red or "no" key and the story develops one way, press the green or "yes" key and the story develops in another way. If the child does nothing at this point, the story develops in a third way. There can be as many as two or three points in the story where this branching of the story can take place. The branching is only limited by the overhead of having extra pages or frames (e.g., the length of the roll). A reader can select many different full length versions of a story for each of the two stories contained in the cartridge.

Referring to FIG. 7, a branching page is shown where the child-is required to interact. At this point, the narrator automatically asks the reader how to continue the story. The choice is also printed within the—outlined rectangle 38. When the narrator says "Do you want the gingerbread man to go with the bear?", the child has the option of pressing the green button "yes" 26 or the red button "no" 28.

Figure 8:
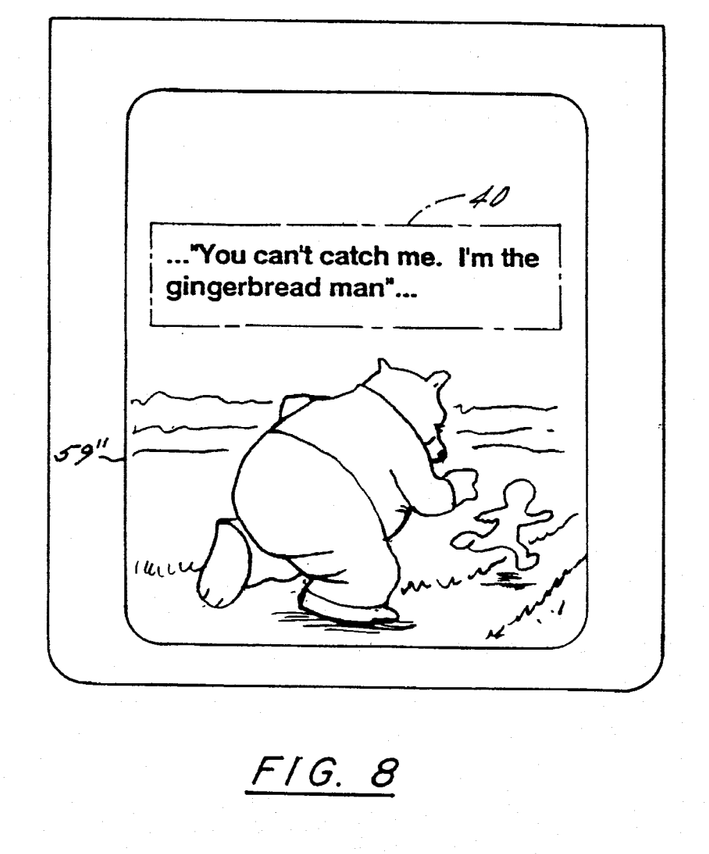
Figure 9:
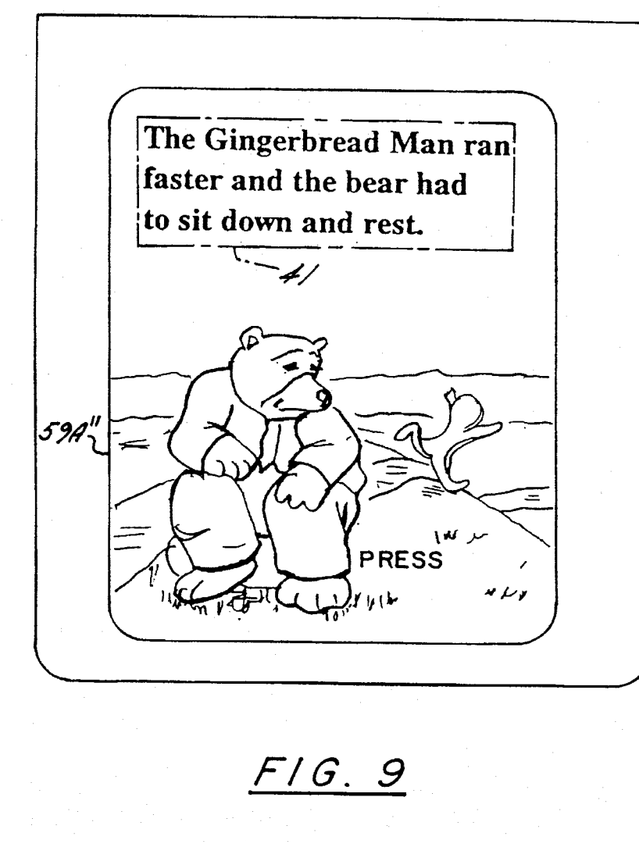

If the reader presses "no" (the button 28) the gingerbread man will say "I ran away from a little boy and I can run away from you too!" At this point the child will press next button 24 and the story will continue as shown in FIGS. 8 and 9. In FIG. 8, and item 104 in FIG. 10, by pressing any word in the dotted rectangle 40 the gingerbread man says "You can't catch me. I'm the Gingerbread Man" as the bear is seen chasing the gingerbread man, at which point the child presses next button 24.

Figure 10:
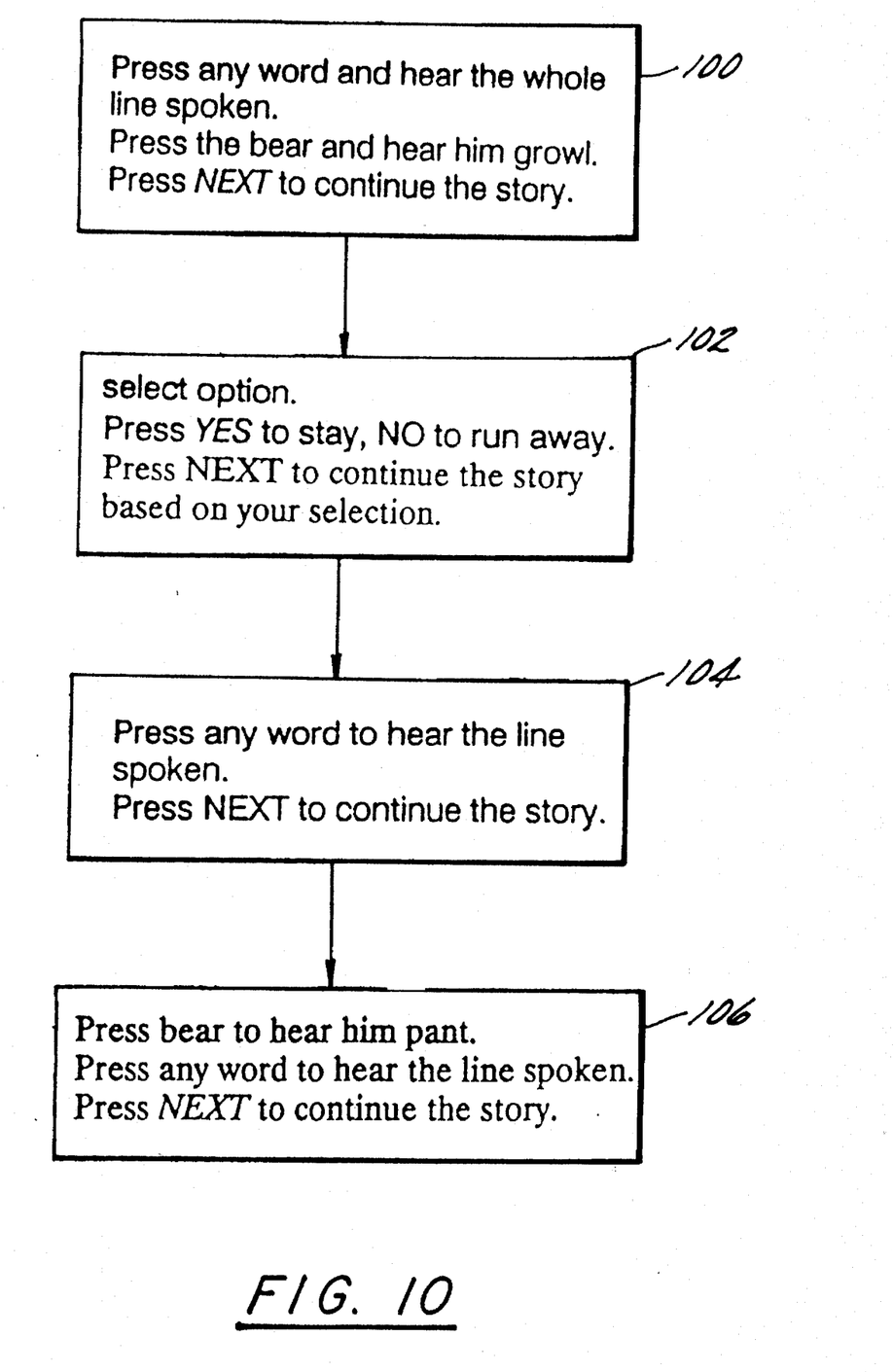
FIG. 10 is a flow diagram for the story of FIGS. 6–9.

In FIG. 9, and item 106 in FIG. 10, the gingerbread man is seen running off and the bear is forced to sit down and rest. At this point pressing the bear will cause the bear to go "Huff puff" and pressing any word in the dotted rectangle 41 will cause the narrator to say "the gingerbread man ran faster and the bear had to sit down and rest."

Referring once again to FIG. 7, and item 102 in FIG. 10, suppose the child had pressed the green button 26 for "yes" instead of the red button 28 for "no" as previously discussed. This time the question by the narrator would be different. In this version, the narrator would say, "If you want Gingerbread Man to go into the red house, press the green "yes button" 26. Then the child would press the next button 24.

Each choice (either pressing the green button 26 or doing nothing) will take the reader to a different frame which logically continues the story with a different story line. Supposing, after going into the red house, the narrator asks, "If you want the gingerbread man to go up stairs and see what is there; first press the red button and then go to the next page". If the child does not press the red button, the talking machine will skip to another alternative. If the child does press the red button, then the machine will show the page with the story continued upstairs. The use of both the red and green buttons can cause as many as three branches to be effected at the branching page.

There can be very simple stories which are just a series of encounters. These can be selected in various sequences. For example, the child can be asked: "Do you want Brother Rabbit to meet the Wicked Witch?" If YES, press the GREEN button if NO "continue": then the story continues with the wicked witch until another selection is required, if the RED button is pressed, then another encounter is presented, for example, the Good Fairy, which continues until a selection is required.

Not only does the interactive talking picture machine of this invention say what is printed on the page, but it also allows children to try reading themselves. When switched to the "Press and Say" mode, the picture will appear in the frame and it will not be spoken by the characters. If the child tries to read a line on a page and has trouble, he or she can put their finger on any word on the line (i.e., thereby actuating the membrane key pad), and the machine will say that line. Children can press one or every line in or out of order and it will say the line when pressed. This is accomplished by the display platform switch matrix which is located behind the cartridge 21. If a key for a line or sentence is pressed, then it will be spoken.

The interactive talking picture machine is not limited to spoken words. For example, if there is a cow shown on the page, an added feature is that by pressing a finger on the cow, it goes "MOO". In the automatic mode, it will occur only after the text is spoken. In the Press and Say mode, it occurs at any time. In some cases, especially for the youngest children, this Press and Say feature can be the major part of the story. The text can ask:

"What does the COW say? Press him too!"
And then with the next picture:
"What does the OWL say? Does he say MOO?"

At the end of every story, there may be a question page. On this page the narrator asks questions about things that happened during the story. These same questions are also printed on the page. Children may answer YES or NO to each question asked, by pressing the "YES" or "NO" printed on the bottom of the page. The questions can be about the whole story including all its current branches. If a question is answered correctly children are congratulated; if incorrectly, they are told that their answer "is not correct".

Questions and answers can be set up at any point in the story.

At the end of the story, the cartridge can be pulled out and inserted the other way for a completely new story. There is no need to rewind a cartridge. However, at any desired time, one may wind the pages backwards to reach previous pages. The title page of each story, or collection of stories is also shown on a label on each side of the cartridge.

Figure 11A:
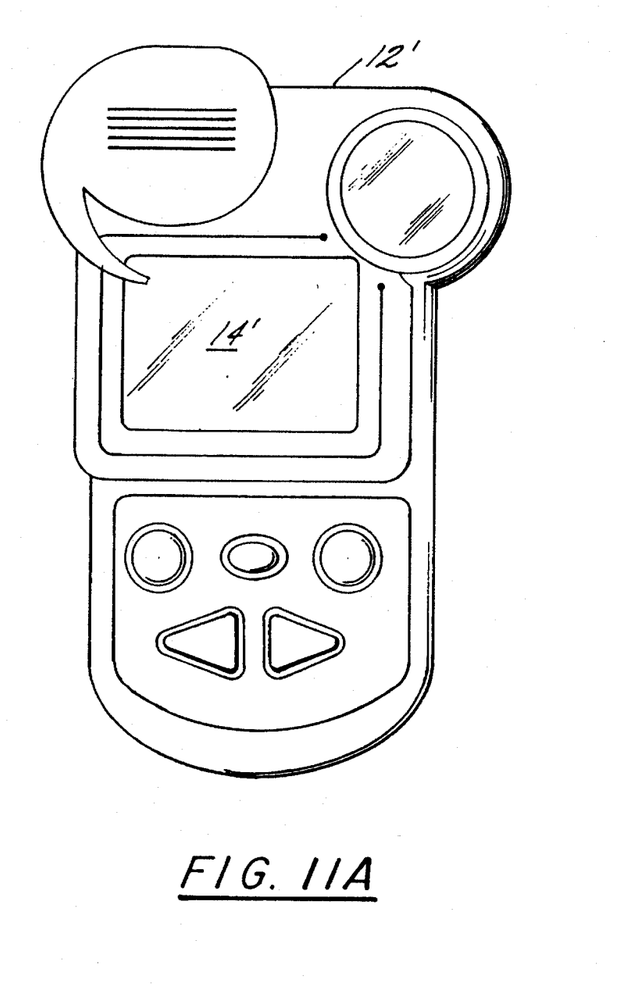
Figure 11B:
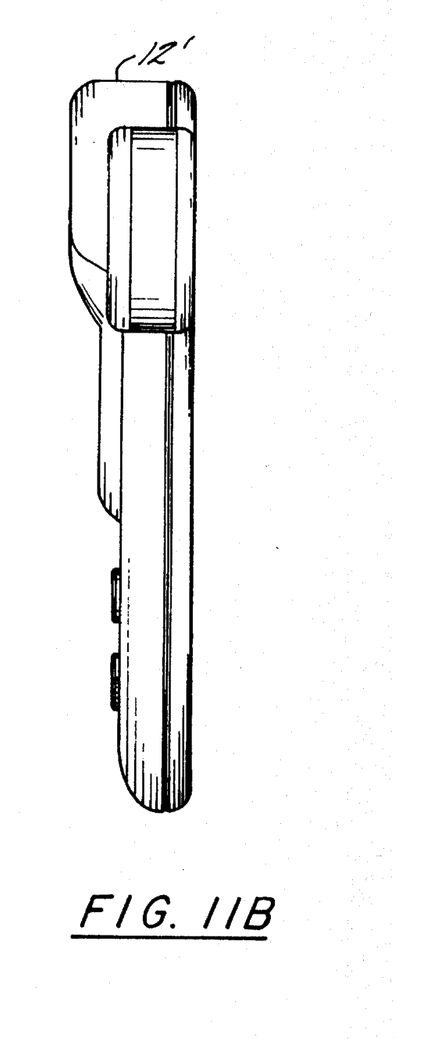
FIG. 11B is a side elevation view of an alternative embodiment of this invention used for depicting cartoons or comic books with character movement.

An alternative embodiment of this invention is depicted in FIGS. 11A and 11B. In this embodiment, a housing 12' is provided having electronics, structural features and controls which are analogous to the housing 12 in the FIG. 1 embodiment. The primary difference between the embodiments of FIGS. 1 and 11 is that FIG. 11 includes a backlit lit display (such as a LCD screen shown at 70 in FIG. 5) in window 14'. In this case, the LCD 70 would be superimposed over the membrane platform 13 so that pressure on the LCD will actuate the underlying key pads 13. Such lighting allows the FIG. 11 embodiment to be well suited for displaying comic books, comic strips, cartoons and the like.

An important feature of the present invention is the ability of the reader to interact with the talking machine in order to alter the story lines of the book (cartridge) being read. This leads to an electronic talking picture machine which offers superior interaction between reader and talking picture book to any electronic books heretofore known. Still another important feature of this invention is the more simplified non-interactive version where the present invention is a reading device characterized by the use of inexpensive replaceable story rolls or cartridges having bar encoded information thereon which is read into a microprocessor stored in an inexpensive housing 12.

Of course, while in a preferred embodiment, the story lines are encoded in bar code format, which is printed on the cartridge story belt; any other means of electronically storing information may be used in connection with this invention. For example, the bar code may be replaced with magnetic tape or a pattern of apertures or notches. However, the bar code storage method is preferred in view of its low cost and low likelihood of becoming damaged.

As previously described, the present invention includes sounds and words of recorded quality. Further, the present invention has the means for the reader to interact with the machine by branching out to different story lines. In addition, the present invention can be used as a reading learning tool and has a question and answer feature to test comprehension and thus may function as a quiz toy.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electronic interactive talking picture machine comprising:

housing means having a viewing portion;

display means positionable on said housing means and having discrete information encoded thereon, said discrete encoded information comprising a bar code, said display means including a plurality of spaced frames with said discrete encoded information being associated with each frame and a selected frame being sequentially movable for viewing in said viewing portion of said housing means, said display means comprising a roll of flexible material with said spaced frames and discrete encoded information selectively depicted on said roll, said discrete encoded information representing audible information corresponding to a plurality of frames;

electronic sensor means in said housing means for reading said encoded information from said display means, said electronic sensor means comprising bar code sensor means; and input switch means for inputting signals responsive to said encoded information from said display means;

control means for integrating said encoded information received from said electronic sensor means with signals input from said input switch means.

2. The electronic picture machine of claim 1 wherein:

said viewing portion includes:

a cavity.

3. The electronic picture machine of claim 2 wherein:

said display means is releasably mounted in said cavity.

4. The electronic picture machine of claim 1 wherein said roll is rotatably housed in a cartridge and including:

a cartridge receiving slot in said housing means, said bar code sensor means communicating with said slot, said slot being dimensioned to receive said cartridge therein whereby said bar code on said roll is read by said bar code sensor means.

5. The electronic picture machine of claim 4 wherein:

said bar code is printed on said roll rotatably contained within said cartridge.

6. The electronic picture machine of claim 1 including:

sound generator means in said housing means and communicating with said control means.

7. The electronic picture machine of claim 1 wherein said input switch means includes:

roll advance means; and roll rewind means.

8. The electronic picture machine of claim 1 including:

a roll receiving slot in said housing means, said bar code sensor means communicating with said slot, said slot being dimensioned to receive said input means therein whereby said bar code on said input means is read by said bar code sensor means.

9. The electronic picture machine of claim 1 wherein said input switch means includes:

branching means responsive to said display means for branching off from a first selected frame to at least one second or third selected frames.

10. The electronic picture machine of claim 9 wherein said branching means comprises:

at least two interactive switch means.

11. The electronic picture machine of claim 9 wherein said bar code is positioned at different levels on said display means and wherein:

said branching means is responsive to said different levels of bar code.

12. The electronic picture machine of claim 9 wherein said bar code is positioned at different levels on said display means and wherein:

said bar code sensor means includes a plurality of optical reading devices for reading different levels of bar code; and said branching means includes an indexed bar code and at least one page group.

13. The electronic picture machine of claim 12 wherein:

said at least one page group includes a plurality of page groups.

14. The electronic picture machine of claim 9 wherein said bar code is positioned at a single level on said display means and wherein:

said bar code sensor means includes a single optical reader; and said branching means includes an indexed bar code and at least one page group.

15. The electronic picture machine of claim 14 wherein:

said at least one page group includes a plurality of page groups.

16. An electronic talking picture machine comprising:

housing means having a viewing portion;

display means positionable in said housing means and having discrete information encoded thereon, said discrete encoded information comprising a bar code, said display means including a plurality of spaced frames with said discrete encoded information being associated with each frame and a selected frame being sequentially movable for viewing in said viewing portion of said housing means, said display means comprising a roll of flexible material with said spaced frames and encoded information selectively depicted on said roll, said discrete encoded information representing audible information corresponding to a plurality of frames;

electronic sensor means in said housing means for reading said encoded information from said display means, said electronic sensor means comprising bar code sensor means; and control means for integrating said encoded information received from said electronic sensor means.

17. The electronic picture machine of claim 16 wherein said roll is rotatably housed in a cartridge and including:

a cartridge receiving slot in said housing means, said bar code sensor means communicating with said slot, said slot being dimensioned to receive said cartridge therein whereby said bar code on said roll is read by said bar code sensor means.

18. The electronic picture machine of claim 16 including:

sound generator means in said housing means and communicating with said control means.

19. The electronic picture machine of claim 16 wherein said housing means includes:

roll advance means; and roll rewind means.

20. The electronic picture machine of claim 16 including:

a roll receiving slot in said housing means, said bar code sensor means communicating with said slot, said slot being dimensioned to receive said input means therein whereby said bar code on said input means is read by said bar code sensor means.

* * * * *